(12) United States Patent
Kim

(10) Patent No.: US 7,058,490 B2
(45) Date of Patent: Jun. 6, 2006

(54) VEHICLE SPEED SENSOR FAILURE DETECTION APPARATUS AND METHOD FOR AN ELECTRONIC CONTROL SYSTEM

(75) Inventor: Wanil Kim, Kyonggi-do (KR)

(73) Assignee: Mando Corporation, Kyonggi-do (KR)

( * ) Notice: Subject to any disclaimer, the term of this patent is extended or adjusted under 35 U.S.C. 154(b) by 90 days.

(21) Appl. No.: 10/980,803

(22) Filed: Nov. 4, 2004

(65) Prior Publication Data
US 2006/0095176 A1    May 4, 2006

(51) Int. Cl.
G06F 19/00 (2006.01)
(52) U.S. Cl. ............................ 701/34; 701/63; 702/116
(58) Field of Classification Search ............... 701/1, 701/34, 63; 702/58, 96, 104, 116, 185; 340/438; 73/2, 488
See application file for complete search history.

(56) References Cited

U.S. PATENT DOCUMENTS

| | | | | |
|---|---|---|---|---|
| 4,835,694 A | * | 5/1989 | Yamamoto et al. | 701/63 |
| 4,928,242 A | * | 5/1990 | Suzuki | 701/34 |
| 4,969,695 A | * | 11/1990 | Maehata et al. | 303/122.06 |
| 5,088,353 A | * | 2/1992 | Yoshida | 477/92 |
| 5,343,396 A | * | 8/1994 | Youngblood | 701/70 |
| 5,671,981 A | * | 9/1997 | Sasaki et al. | 303/122.06 |
| 5,922,038 A | * | 7/1999 | Horiuchi et al. | 701/34 |
| 6,480,771 B1 | * | 11/2002 | Nishida et al. | 701/34 |

* cited by examiner

Primary Examiner—Gary Chin
(74) Attorney, Agent, or Firm—Bacon & Thomas

(57) ABSTRACT

A vehicle speed sensor failure detection apparatus for an electronic control system having a vehicle speed sensor for generating a vehicle speed information signal indicating vehicle speed information includes a vehicle behavior detection portion, a brake sensor and a failure detection portion. If vehicle speed information generated from the vehicle speed sensor is less than or equal to a vehicle speed reference level stored in the failure detection portion, the vehicle behavior information signal generated during a predetermined period of time has a portion exceeding the behavior reference level stored in the failure detection portion and the brake is in the OFF state, the failure detection portion generates a failure signal.

9 Claims, 2 Drawing Sheets

VEHICLE SPEED SENSOR FAILURE DETECTION APPARATUS AND METHOD FOR AN ELECTRONIC CONTROL SYSTEM

FIELD OF THE INVENTION

The present invention relates to an electronic control system for a vehicle; and more particularly, a vehicle speed sensor failure detection apparatus and method for the electronic control system, which is capable of avoiding mis-control of the electronic control system caused by a failure of a vehicle speed sensor.

BACKGROUND OF THE INVENTION

In general, an electronic control system for a vehicle receives information from a variety of sensors, processes the received information, and drives a corresponding circuit and/or an actuator in such a way that appropriate control operations can be performed. There are a variety of electronic control systems, for example, an electronically-controlled suspension system, an electronically-controlled steering system, an ABS (anti-lock brake system), a TCS (traction control system), an ESP (electronic stability program), etc.

Particularly, in the electronic control system, since a device for determining a vehicle running state or a road surface condition or a device for calculating gain which determines control amount in response to a vehicle speed generates output data using vehicle speed information, the vehicle speed information must have high accuracy. Therefore, it is necessary to determine the presence or absence of a failure of the vehicle speed sensor for providing the vehicle speed information.

The electronic control system determines the presence or absence of the vehicle speed sensor failure on the basis of the information received from a plurality of sensors installed in the vehicle. More specifically, a conventional vehicle speed sensor failure detection apparatus of the electronic control system determines the presence or absence of the vehicle speed sensor failure on the basis of information received from a throttle position sensor, a brake sensor, a vehicle speed sensor and a gear position sensor.

If a TPS value of the throttle position sensor is equal to or greater than a predetermined level, a brake state is in an OFF state, a gear position is in a drive position and a vehicle speed is less than a predetermined vehicle speed, the conventional vehicle speed sensor detection apparatus determines the presence (or occurrence) of the vehicle speed sensor failure. Then, in order to avoid a danger resulting from the mis-control caused by the incorrect vehicle speed information, the conventional vehicle speed sensor failure detection apparatus stops the control operation of the electronic control system and informs a user of the control system failure occurrence.

However, some diesel vehicles or systems are not equipped with the throttle position sensor. In this case, since the electronic control system determines the presence or absence of the vehicle speed sensor failure without using information from the throttle position sensor, determining the presence or absence of the vehicle speed sensor failure is not correct which leads to the mis-control in control operations of the electronic control system using the vehicle speed information.

Further, the gear position sensor for providing gear position information may not be installed in some vehicles or systems. In this case, since the electronic control system determines the presence or absence of the vehicle speed sensor failure without using the gear position information, determining the presence or absence of the vehicle speed sensor failure is not correct which also leads to the mis-control in the control operations of the electronic control system using the vehicle speed information.

SUMMARY OF THE INVENTION

It is, therefore, an object of the present invention to provide a vehicle speed sensor failure detection apparatus and method for an electronic control system, which is capable of determining the presence or absence of a vehicle speed sensor failure using vehicle speed information, vehicle behavior information and brake state information, and stopping a control operation of the electronic control system using the vehicle speed information if the presence of the vehicle speed sensor failure is determined, so that mis-control in the control operation of the electronic control system using the vehicle speed information can be prevented.

In accordance with one aspect of the invention, there is provided a vehicle speed sensor failure detection apparatus for an electronic control system which has a vehicle speed sensor for detecting a vehicle speed of a vehicle and generating a vehicle speed information signal indicating vehicle speed information, including: a vehicle behavior detection portion for detecting a behavior of the vehicle and generating a vehicle behavior information signal indicating vehicle behavior information; a brake sensor for determining whether a brake of the vehicle is in an ON state or an OFF state and generating a brake state information signal indicating brake state information; and a failure detection portion for storing a vehicle speed reference level and a behavior reference level and receiving the vehicle speed information signal, the vehicle behavior information signal and the brake state information signal, wherein if the vehicle speed information is less than or equal to the vehicle speed reference level, the vehicle behavior information signal generated during a predetermined period of time includes a portion exceeding the behavior reference level and the brake is in the OFF state, the failure detection portion generates a failure signal.

In accordance with another aspect of the invention, there is provided a vehicle speed sensor failure detection apparatus for an electronic control system which has a vehicle speed sensor for detecting a vehicle speed of a vehicle and generating a vehicle speed information signal indicating vehicle speed information, including: a vehicle behavior detection portion for detecting a behavior of the vehicle and generating a vehicle behavior information signal indicating vehicle behavior information; a brake sensor for determining whether a brake of the vehicle is in an ON state or an OFF state and generating a brake state information signal indicating brake state information; and a failure detection portion for storing a vehicle speed change rate reference level and a behavior reference level, receiving the vehicle speed information signal, the vehicle behavior information signal and the brake state information signal, and calculating a change rate of the vehicle speed information, wherein if the change rate of the vehicle speed information generated during a predetermined first period of time is less than or equal to the vehicle speed change rate reference level, the vehicle behavior information signal generated during a predetermined second period of time includes a portion exceeding the behavior reference level, and the brake is in the OFF state, the failure detection portion generates a failure signal.

In accordance with still another aspect of the invention, there is provided a vehicle speed sensor failure detection method for an electronic control system which stores a vehicle speed reference level and a behavior reference level, including the steps of: detecting a vehicle speed of a vehicle and generating a vehicle speed information signal indicating vehicle speed information; detecting a behavior of the vehicle and generating a vehicle behavior information signal indicating vehicle behavior information; determining whether a brake of the vehicle is in an ON state or an OFF state, and generating a brake state information signal indicating brake state information; generating a failure signal, if the vehicle speed information is less than or equal to the vehicle speed reference level, the vehicle behavior information signal generated during a predetermined period of time includes a portion exceeding the behavior reference level, and the brake is in the OFF state; and stopping a control operation of the electronic control system in response to the failure signal, the control operation of the electronic control system using the vehicle speed information.

BRIEF DESCRIPTION OF THE DRAWINGS

The above and other objects and features of the present invention will become more apparent from the following description of preferred embodiments given in conjunction with the accompanying drawings, in which.

DETAILED DESCRIPTION OF THE PREFERRED EMBODIMENTS

Preferred embodiments of the present invention will now be described in detail with reference to the accompanying drawings.

Figure 1:
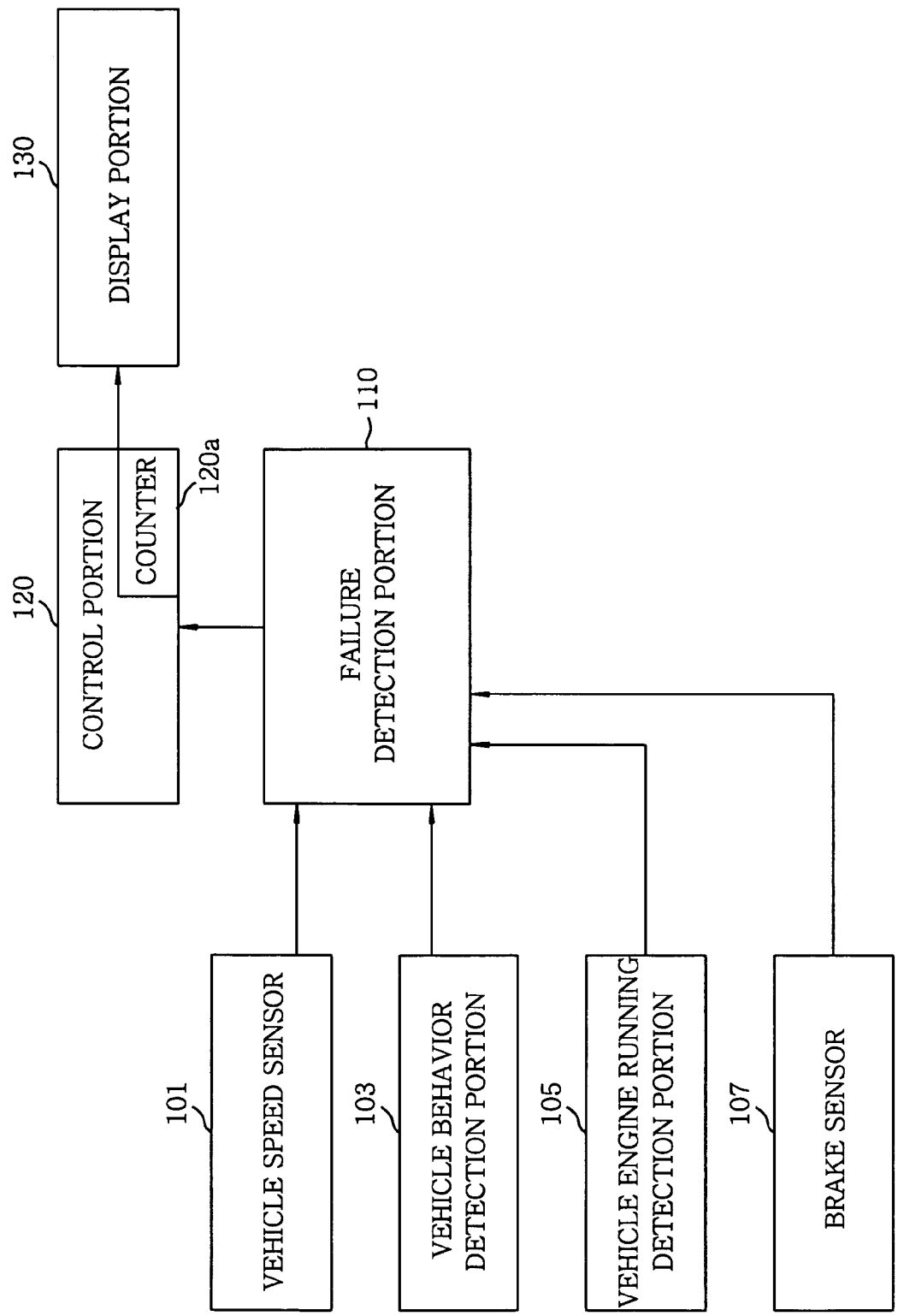
FIG. 1 is a block diagram of a vehicle speed sensor failure detection apparatus for an electronic control system in accordance with a preferred embodiment of the present invention.

Referring to FIG. 1, there is provided a block diagram of a vehicle speed sensor failure detection apparatus for an electronic control system in accordance with a preferred embodiment of the present invention. As shown in FIG. 1, the vehicle speed sensor failure detection apparatus for determining a failure of a vehicle speed sensor 101 includes a vehicle behavior detection portion 103, a vehicle engine running detection portion 105, a brake sensor 107, a failure detection portion 110, a control portion 120 and a display portion 130.

The vehicle speed sensor 101 detects a vehicle speed, generates and transmits to the failure detection portion 110 a vehicle speed information signal indicating vehicle speed information.

The vehicle engine running detection portion 105 determines whether a vehicle engine is in an ON or OFF state, generates and transmits to the failure detection portion 110 an engine state information signal indicating vehicle engine state information, wherein the ON state of the vehicle engine indicates that the vehicle engine is running, and the OFF state of the vehicle engine indicates that the vehicle engine is not running.

The vehicle behavior detection portion 103 detects behavior of the vehicle by using signals detected by a vertical acceleration sensor, a horizontal acceleration sensor, a steering angle sensor, a vehicle height sensor and like, generates and transmits to the failure detection portion 110 a vehicle behavior information signal indicating vehicle behavior information.

The brake sensor 107 determines whether a vehicle brake is in an ON state or OFF state, generates and transmits to the failure detection portion 110 a brake state information signal indicating vehicle brake state information, wherein the ON state of the vehicle brake indicates that the vehicle brake generates a braking force and the OFF state of the vehicle brake indicates that the vehicle brake does not generate the braking force.

The failure detection portion 110, which receives the vehicle speed information signal, the vehicle behavior information signal, the engine state information signal and the brake state information signal, stores a vehicle speed reference level (or a first reference level) and a vehicle behavior reference level (or a second reference level) which are used to determine the presence or absence of the failure of the vehicle speed sensor 101. Further, in case noise or DC offset must be removed from the vehicle behavior information signal of the vehicle behavior detection portion 103, the failure detection portion 110 may further include a low pass filter or a high pass filter.

The failure detection portion 110 filters the vehicle behavior information signal of the vehicle behavior detection portion 103. If the vehicle behavior information signal filtered during a predetermined period of time includes a portion exceeding the second reference level, the vehicle speed information (or vehicle speed) is less than or equal to the first reference level and the vehicle brake is in the OFF state, the failure detection portion 110 generates and transmits a failure signal to the control portion 120.

Further, if the vehicle behavior information signal filtered during the predetermined period of time includes the portion exceeding the second reference level, the vehicle speed information (or vehicle speed) is less than or equal to the first reference level, the vehicle brake is in the OFF state and the vehicle engine is in the ON state, the failure detection portion 110 generates and transmits the failure signal to the control portion 120.

That is, the failure detection portion 110 determines the presence or absence of the vehicle speed sensor failure either by using the information from the vehicle speed sensor 101, the vehicle behavior detection portion 103 and the brake sensor 107, or by using the information from the vehicle speed sensor 101, the vehicle behavior detection portion 103, the brake sensor 107 and the vehicle engine running detection portion 105.

Upon receipt of the failure signal from the failure detection portion 110, the control portion 120 stops a control operation of the electronic control system using the vehicle speed information transmitted from the vehicle speed sensor 101, for example, a control operation of an electronically-controlled suspension system or an electronically-controlled steering system which controls the control amount of an actuator by using the vehicle speed information.

Further, the control portion 120 includes a counter 120a for counting the number of occurrence times of the failure signal from the failure detection portion 110. If the number of occurrence times of the failure signal reaches a predetermined number of times, the counter 120a generates and transmits a warning signal to the display portion 130.

The warning signal is displayed on the display portion 130 constituted by an LCD or LED, so that a user can be informed of the failure of the vehicle speed sensor 101.

As described above, the failure detection portion 110 directly uses the vehicle speed information (or vehicle speed) to determine the presence or absence of the failure of the vehicle speed sensor 101. However, the failure detection portion 110 can use a change rate of the vehicle speed information (or vehicle speed) generated during a predetermined period of time. In other words, if the change rate of the vehicle speed information (or vehicle speed) is less than or equal to a predetermined level, the vehicle behavior information signal filtered during a predetermined period of time includes the portion exceeding the second reference level and the vehicle brake is in the OFF state, the failure detection portion 110 generates and transmits the failure signal to the control portion 120.

A vehicle speed sensor failure detection operation of the aforementioned vehicle speed sensor failure detection apparatus for use in the electronic control system will now be described with reference to FIG. 2.

Figure 2:
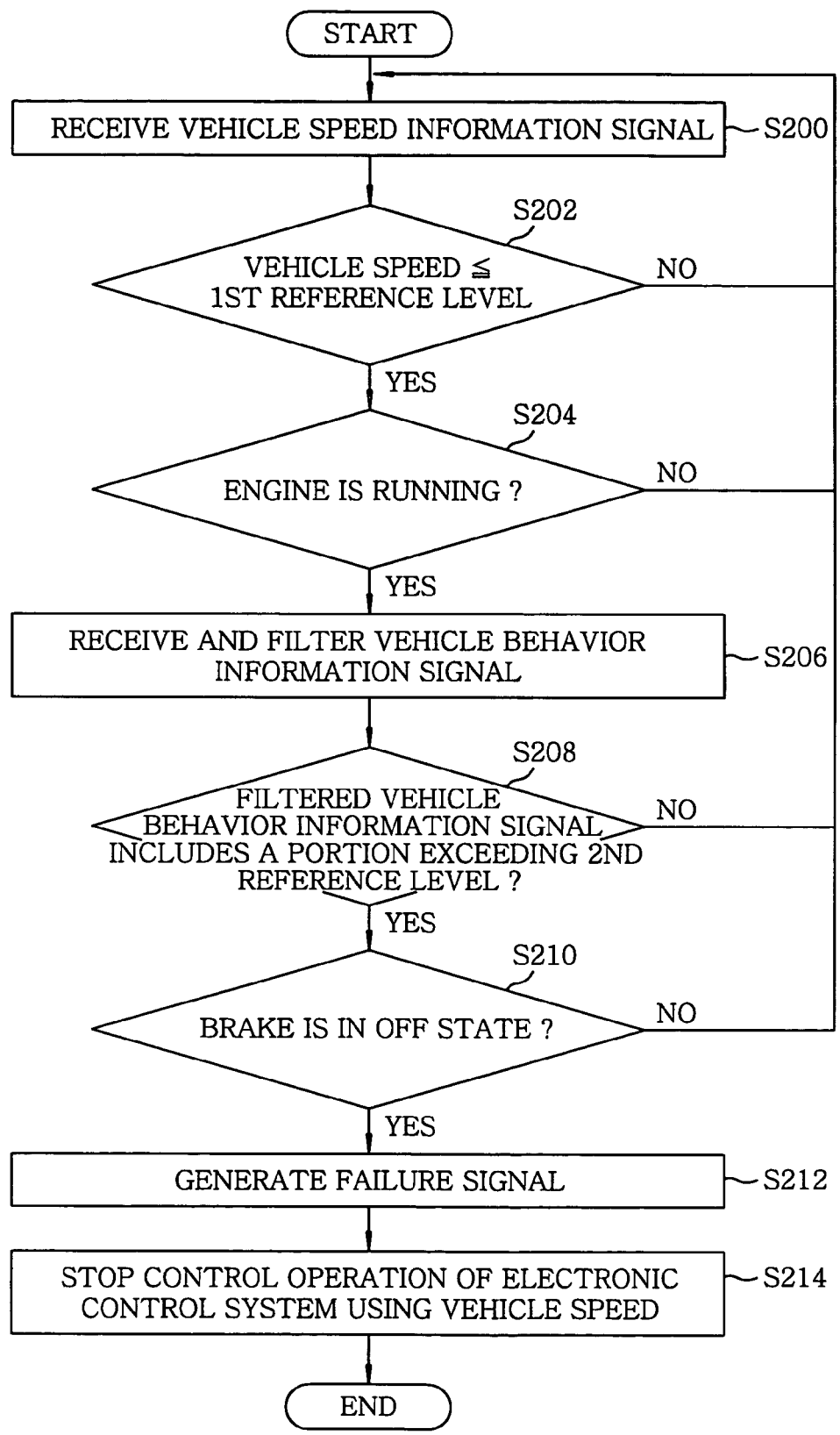
FIG. 2 presents a flow chart illustrating operation of the vehicle speed sensor failure detection apparatus of FIG. 1.

As shown in FIG. 2, the failure detection portion 110 receives the vehicle speed information signal from the vehicle speed sensor 101 at step S200, and determines whether the received vehicle speed information (or vehicle speed) is less than or equal to the first reference level at step S202.

If the received vehicle speed information (or vehicle speed) is greater than the first reference level at step S202, the vehicle speed sensor failure detection operation returns to step S200, so that the failure detection portion 110 receives the vehicle speed information signal from the vehicle speed sensor 101. Meanwhile, if the received vehicle speed information (or vehicle speed) is less than or equal to the first reference level, the failure detection portion 110 determines, at step S204, whether or not the vehicle engine is in the ON state, i.e., the vehicle engine is running, on the basis of the engine state information from the vehicle engine running detection portion 105.

If the vehicle engine is determined to be in the OFF state at step 204, the vehicle speed sensor failure detection operation returns to step S200, so that the failure detection portion 110 receives the vehicle speed information signal from the vehicle speed sensor 101. Meanwhile, if the vehicle engine is determined to be in the ON state at step S204, the failure detection portion 110 receives and filters the vehicle behavior information signal at step S206, and then determines whether or not the filtered vehicle behavior information signal includes the portion exceeding the second reference level at step S208.

If the filtered vehicle behavior information signal does not include the portion exceeding the second reference level at step S208, the vehicle speed sensor failure detection operation returns to step S200, so that the failure detection portion 110 receives the vehicle speed information signal from the vehicle speed sensor 101. Meanwhile, if the filtered vehicle behavior information signal includes the portion exceeding the second reference level at step S208, the failure detection portion 110 determines, at step S210, whether or not the vehicle brake is in the OFF state on the basis of the brake state information received from the brake sensor 107.

If the vehicle brake is in the ON state at step S210, the vehicle speed sensor failure detection operation returns to step S200, so that the failure detection portion 110 receives the vehicle speed information signal from the vehicle speed sensor 101. Meanwhile, if the vehicle brake is in the OFF state at step S210, the failure detection portion 110 determines the occurrence of the failure of the vehicle speed sensor 101, and transmits the failure signal to the control portion 120 at step S212.

In response to the failure signal from the failure detection portion 110, the control portion 120 stops, at step S214, the control operation of the electronic control system using the vehicle speed.

In the aforementioned preferred embodiment, although the vehicle speed sensor failure is determined by directly using the vehicle speed information (or vehicle speed), it should be noted that the vehicle speed sensor failure detection operation may use the change rate of the vehicle speed information (or vehicle speed). That is, at step S202, the change rate of the vehicle speed information (or vehicle speed) during a predetermined period of time can be used.

As described above, the vehicle speed sensor failure detection apparatus and method of the present invention determines the presence or absence of the vehicle speed sensor failure by using information on the vehicle speed, the vehicle behavior, the brake state and the engine state, and if there is the vehicle speed sensor failure, the control operation of the electronic control system using the vehicle speed information is stopped to avoid the mis-control of the electronic control system.

While the invention has been shown and described with respect to the preferred embodiments, it will be understood by those skilled in the art that various changes and modifications may be made without departing from the spirit and scope of the invention as defined in the following claims.

What is claimed is:

1. A vehicle speed sensor failure detection apparatus for an electronic control system which has a vehicle speed sensor for detecting a vehicle speed of a vehicle and generating a vehicle speed information signal indicating vehicle speed information, comprising:

a vehicle behavior detection portion for detecting a behavior of the vehicle and generating a vehicle behavior information signal indicating vehicle behavior information by using at least one of signals generated from a vertical acceleration sensor, a horizontal acceleration sensor, a steering angle sensor and a vehicle height sensor;

a brake sensor for determining whether a brake of the vehicle is in an ON state or an OFF state and generating a brake state information signal indicating brake state information; and a failure detection portion for storing a vehicle speed reference level and a behavior reference level and receiving the vehicle speed information signal, the vehicle behavior information signal and the brake state information signal, wherein if the vehicle speed information is less than or equal to the vehicle speed reference level, the vehicle behavior information signal generated during a predetermined period of time includes a filtered portion exceeding the behavior reference level and the brake is in the OFF state, the failure detection portion generates a failure signal.

2. The apparatus of claim 1, further comprising an engine running detection portion for determining whether an engine of the vehicle is in an ON state or an OFF state and generating an engine state information signal indicating engine state information, wherein if the vehicle speed information is less than or equal to the vehicle speed reference level, the vehicle behavior information signal generated during the predetermined period of time includes the filtered portion exceeding the behavior reference level, the brake is in the OFF state and the engine is in the ON state, the failure detection portion generates the failure signal.

3. The apparatus of claim 1, further comprising a control portion for stopping a control operation of the electronic control system when the failure signal is generated, the control operation of the electronic control system using the vehicle speed information.

4. The apparatus of claim 3, wherein the control portion includes a counter for counting the number of occurrence times of the failure signal, and generating a warning signal if the number of occurrence times of the failure signal is greater than a predetermined number of times.

5. The apparatus of claim 4, further comprising a display portion for displaying the warning signal generated from the counter of the control portion.

6. A vehicle speed sensor failure detection apparatus for an electronic control system which has a vehicle speed sensor for detecting a vehicle speed of a vehicle and generating a vehicle speed information signal indicating vehicle speed information, comprising:
 a vehicle behavior detection portion for detecting a behavior of the vehicle and generating a vehicle behavior information signal indicating vehicle behavior information by using at least one of signals generated from a vertical acceleration sensor, a horizontal acceleration sensor, a steering angle sensor and a vehicle height sensor;
 a brake sensor for determining whether a brake of the vehicle is in an ON state or an OFF state and generating a brake state information signal indicating brake state information; and
 a failure detection portion for storing a vehicle speed change rate reference level and a behavior reference level, receiving the vehicle speed information signal, the vehicle behavior information signal and the brake state information signal, and calculating a change rate of the vehicle speed information,
 wherein if the change rate of the vehicle speed information generated during a predetermined first period of time is less than or equal to the vehicle speed change rate reference level, the vehicle behavior information signal generated during a predetermined second period of time includes a filtered portion exceeding the behavior reference level, and the brake is in the OFF state, the failure detection portion generates a failure signal.

7. A vehicle speed sensor failure detection method for an electronic control system which stores a vehicle speed reference level and a behavior reference level, comprising the steps of:
 detecting a vehicle speed of a vehicle and generating a vehicle speed information signal indicating vehicle speed information;
 detecting a behavior of the vehicle and generating a vehicle behavior information signal indicating vehicle behavior information by using at least one of signals generated from a vertical acceleration sensor, a horizontal acceleration sensor, a steering angle sensor and a vehicle height sensor;
 determining whether a brake of the vehicle is in an ON state or an OFF state, and generating a brake state information signal indicating brake state information;
 generating a failure signal, if the vehicle speed information is less than or equal to the vehicle speed reference level, the vehicle behavior information signal generated during a predetermined period of time includes a portion exceeding the behavior reference level, and the brake is in the OFF state; and
 stopping a control operation of the electronic control system in response to the failure signal, the control operation of the electronic control system using the vehicle speed information.

8. The method of claim 7, wherein the vehicle behavior information signal is generated by using at least one of signals generated from a vertical acceleration sensor, a horizontal acceleration sensor, a steering angle sensor and a vehicle height sensor.

9. The method of claim 7, further comprising the step of determining whether an engine of the vehicle is in an ON state or an OFF state and generating an engine state information signal indicating engine state information,
 wherein if the vehicle speed information is less than or equal to the vehicle speed reference level, the vehicle behavior information signal generated during the predetermined period of time includes the filtered portion exceeding the behavior reference level, the brake is in the OFF state and the engine is in the ON state, the failure signal is generated.

* * * * *